May 30, 1950
L. RUHLAND
2,509,531
METHOD AND MOLD FOR MAKING ELASTIC BAGS
Filed July 18, 1946
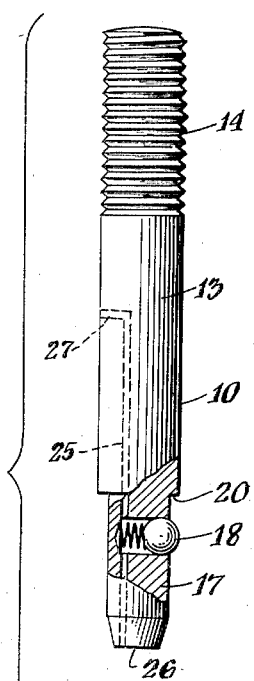
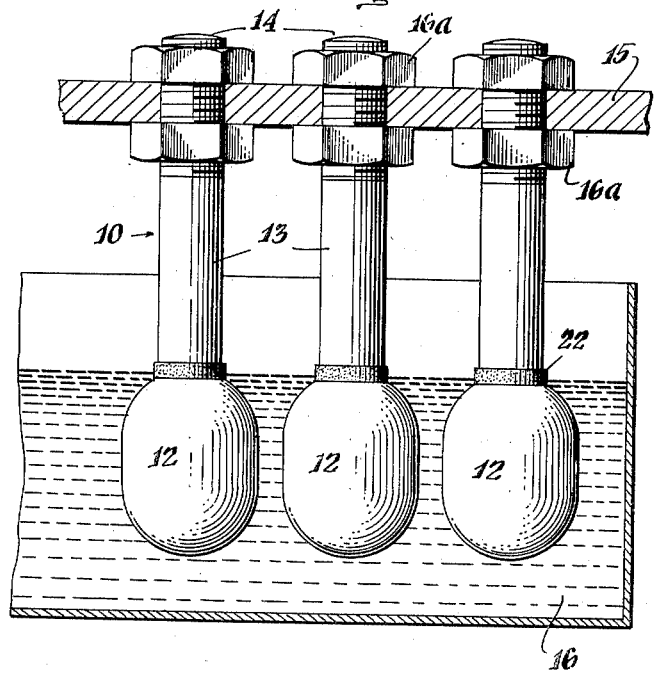
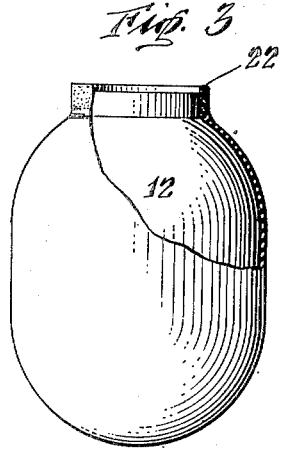
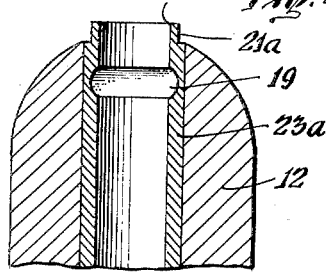
INVENTOR
Ludwig Ruhland
BY Norman R. Holland
ATTORNEY Patented May 30, 1950

2,509,531

UNITED STATES PATENT OFFICE 2,509,531

METHOD AND MOLD FOR MAKING ELASTIC BAGS

Ludwig Ruhland, Secaucus, N. J.

Application July 18, 1946, Serial No. 684,430

5 Claims. (Cl. 18—41)

The present invention relates to molds and method of molding for producing thin elastic bags, especially such bags as are characterized by an elastic band of different thickness located at an opening of smaller diameter than the central diameter of the bag.

It has hitherto been customary to form such bags on a mold, frictionally held to a stem. An elastic band was placed on the stem just above the point where it enters the mold, and then the mold, held by the stem, was immersed one or more times in a latex solution to a depth sufficient to bring the band in contact with the solution so that the deposited latex was caused to unite with the band and to cover the mold. The latex solution was natural latex, or for some purposes a synthetic solution such as "neoprene." Then the mold was removed from the stem, the projecting edge of the band was seized, and the bag stripped from the mold.

Many objections have been found to arise in thus molding the bags. One mechanical difficulty arises from the fact that the stems or the openings in the mold wear down where the stems engage the molds so that the molds are loosely held and fall off in the dipping operation.

Another difficulty arises from the fact that the wearing of the molds and stems leaves an opening between them into which latex flows and this latex dries as an internal fin or flash within the bands, making an imperfect product.

These and some other difficulties are complicated by the fact that the molds are usually mounted by their stems in frames which may carry upwards of a hundred molds.

According to the present invention, the foregoing and other difficulties and objections are overcome, and a mold device is provided in which the mold is firmly held despite wear, and in which a vulcanized rubber band effectively seals the joint between the stem and its mold.

In the form herein shown in some detail, these advantages are attained by holding the mold to its stem by a spring detent, and by providing a collar around the opening in the mold so that when the mold is on the stem the collar forms a continuation of the outer surface of the stem, and the elastic band may be upon the collar so as to overlap upon the stem, sealing the joint where they come together. Thus the joint effectively is prevented from admitting latex and no fin can form within the band, and weak points between the band and the bag are eliminated.

An object of the invention is to produce more perfect bags and to minimize the number of defective bags.

Another object of the invention is to minimize the wear on the molds and to minimize the effect of such wear on the molding operations and the bags produced.

A further object of the invention is to provide a mold less likely to give trouble in use and having a much longer life.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is an exploded side view of the mold and stem, partly in section;

Fig. 2 is a side elevational view, partly in section, illustrating the molds dipped into a reservoir containing a suitable solution;

Fig. 3 is a side view of the molded bag on the mold with the stem removed; and

Fig. 4 is a fragmentary sectional view similar to Fig. 2 showing a modified construction of mold.

Referring further to the drawings illustrating a preferred embodiment of the invention, a molding device includes a shaft or stem 10 which is adapted to fit in an opening 11 of a mold or bulb 12. The shaft 10 preferably includes a cylindrical body 13 having a threaded end 14, so that the end 14 can be screwed into a base 15 and be locked in place by lock nuts 16a which may be screwed up against the base 15. The base 15 often carries upward of a hundred shafts 10 with their heads 12 to be dipped simultaneously in a bath 16 of latex, or rubber cement, or other solution which precipitates elastic material or other suitable bag-forming material on the head 12. These solutions are well-known and a detailed description of one or more is not necessary, as the invention relates more particularly to the mold and method of molding.

The details of the lower end of the stem 10 are shown more particularly in the exploded view of Fig. 1 of the drawings and include a reduced end portion 17 adapted to fit in the opening 11 in the head 12 which will be described hereinafter. Preferably the extreme end of the stem is tapered to facilitate entry into the opening 11 and has a cylindrical portion leading to a shoulder 20. The cylindrical portion may form a friction fit with the opening 11 and the shoulder 20 preferably abuts the end of the collar 21 on the head. In order to avoid any trapping of air when the stem is inserted in the opening, a conduit or air duct 25 extends from the end 26 through the body of the stem with an opening at the side indicated at 27 which is beyond the shoulder 20. In this way the inside of the opening 11 is connected with the outside atmosphere when the stem 10 is inserted to avoid trapping of air.

In order to secure the stem in place, the reduced end has a recess formed with a spring therein resiliently pressing a ball or detent 18 toward its outer position. The end of the recess may be peened to retain the ball.

The head 12 may be in various forms but as illustrated herein it comprises an outer relatively smooth portion which may be made of any suitable material. Aluminum has been found to be excellent and plastics may also be used to advantage. It is desirable that the material used have a smooth exterior and be light in weight. This facilitates handling the parts as it is desirable to mount a large number of heads on a single support. Materials such as aluminum and plastics are relatively soft and wear more easily and more rapidly than steel and similar materials. To minimize the wear herein and at the same time to form a collar about the opening in the head, a tubular member 23 of a hard material may be secured in the opening in the head 12 and may form a collar about the opening, as shown in Fig. 4, or a collar 21 integral with the mold may be utilized, as shown in Fig. 1.

Preferably the tubular member has an annular recess 19 adapted to co-operate with the ball detent 18 on the stem 10 to hold the stem in position therein. Preferably also the size of the tubular member 23 is such that it forms a friction fit with the reduced portion 17 of the stem. The tubular member 23 extends beyond the opening in the head through the collar 21 (Fig. 2) formed about the opening 11 as an extension of the mold 12. This collar abuts the shoulder 20 to form a smooth joint in the preferred embodiment. The depth of the collar is preferably slightly less than the width of the elastic band 22, made of vulcanized rubber or other elastic material which in the form described lies about the collar, as shown more particularly in Figs. 2 and 3. The purpose of this is to cover the joint so that latex does not get into it. In addition, it forms a protruding part permitting engagement of the upper end of the bag to remove it from the mold.

If desired, a tube 23a may be utilized as shown in Fig. 4. The protruding end 29 of the tube 23a is preferably made of reduced size to provide the collar 21a, the collar 21a being adapted to abut the shoulder 20 and being of the same diameter as the body 13 of the stem 10.

In the molding operation it is preferable to place an elastic band 22 around the collar 21, preferably before assembly of the mold 12 with the stem 10. The width of the band should generally be such that the edg of the band stands up a millimeter or two above the edge of the collar 21. If the band is placed on the mold before the assembly to the stem, the mold is then pushed down upon the fixed stem. When pushed home in the opening 11, the ledge or shoulder 20 on the stem passes inside of the elastic band and the joint or junction of the collar 11 and the shoulder 20 is under the band. The band thus seals the crack between the ledge 20 and the collar 21, and preferably the stem forms a continuation of the outer periphery of the collar 21. The detent 18 holds the head securely in position so that there is no danger of it dropping off. The friction fit between the surface 17 and the interior of the tube 23 improves the union but is not essential.

With the parts thus assembled, the mold is then dipped in the bath 16 as shown in Fig. 2 so that the molds 12 are immersed in the bath, with the surface of the bath contacting and wetting the bands 22. It is usually unnecessary and undesirable to dip deeply enough to cover the whole width of the band. The mold is then withdrawn, bringing with it on the surface thereof a film of the molding material. The number of times the mold is dipped will depend on the results desired and the period of drying will depend on the atmospheric conditions and other variables. The drying may be done in a controlled atmosphere, if desired.

The operator then removes the mold 12 from the stem 13, the bag being dry. The bag is then seized by the projecting edge of the band 22 above the collar 21, and the bag of deposited material stripped from the mold 12 over the swell of the body.

It will be seen that the present mold and method provide a stronger union with the band, eliminate the formation of fins, and minimize the number of defective bags produced. The mold is simple in construction and wear is minimized by the construction and relation of the parts. In addition, wear between the parts does not impair the product molded. The parts are rugged and fully capable of withstanding rough usage.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of molding a hollow article by dipping a two-part mold into a solidifiable liquid which comprises assembling the two parts of the mold to provide an intervening joint, disposing an elastic covering band over said joint so as to overlap the margins thereof and constrict radially inwardly against portions of both parts, dipping the mold into the liquid until the liquid covers a portion of the band, removing the mold from the liquid, separating the two mold parts, and stripping the product.

2. The method of molding a hollow article by dipping into a solidifiable liquid a two-part mold having cylindrical portions united with an intervening joint which comprises telescoping an elastic band partially over one of said parts with a portion of said band projecting endwise from said part, assembling said parts to form said joint intermediate edge portions of said band, dipping the mold into the liquid until the liquid covers a portion of the band, removing the mold from the liquid, separating the two mold parts, and stripping the product.

3. A molding device comprising the combination of a generally cylindrical stem having a reduced portion forming an annular shoulder, a removable head including a radially enlarged portion and having a generally cylindrical terminal portion, of substantially the same outside diameter as the outside diameter of said stem, extending axially from said radially enlarged portion, said head being formed with a socket opening through said terminal portion for receiving said reduced portion, whereby said stem and head form a continuous flush exterior surface when the free end of said terminal portion abuts said shoulder.

4. A molding device comprising the combination of a generally cylindrical stem having a reduced portion forming an annular shoulder, a removable head including a radially enlarged portion and having a generally cylindrical terminal portion, of substantially the same outside diameter as the outside diameter of said stem, extending axially from said radially enlarged portion, said head being formed with a socket opening through said terminal portion for receiving said reduced portion, and a tubular metal liner in said socket with an end terminating at the free end of said terminal portion, whereby said stem and head form a continuous flush exterior surface when the free end of said terminal portion abuts said shoulder.

5. A molding device comprising the combination of a generally cylindrical stem member having a portion forming an annular shoulder, a removable head member including a radially enlarged portion and having a generally cylindrical terminal portion, of substantially the same outside diameter as the outside diameter of said stem, extending axially from said radially enlarged portion, one of said members having a reduced portion and the other being formed with a socket opening for receiving said reduced portion, whereby said stem and head form a continuous flush exterior surface when a free end of said terminal portion abuts said shoulder, and means for releasably retaining said members together with said free end of the terminal portion and said shoulder abutting.

LUDWIG RUHLAND.

REFERENCES CITED

The following references are of record in the file of this patent:

UNITED STATES PATENTS

| Number | Name | Date |
|--------|------|------|
| 389,335 | Spear | Aug. 11, 1888 |
| 1,322,467 | Powell | Nov. 18, 1919 |
| 2,114,794 | Bratring | Apr. 19, 1938 |
| 2,162,359 | Rhinevault | June 13, 1939 |
| 2,315,283 | Thompson | Mar. 30, 1943 |
| 2,442,454 | Bodell | June 1, 1948 |

Certificate of Correction

Patent No. 2,509,531                                       May 30, 1950

LUDWIG RUHLAND

It is hereby certified that errors appear in the printed specifications of the above numbered patent requiring correction as follows:

Column 3, line 66, for "edg" read *edge*; column 6, line 10, for the word "returning" read *retaining*;

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*